United States Patent [19]
Kitamoto

[11] Patent Number: 5,245,837
[45] Date of Patent: Sep. 21, 1993

[54] AIR-CONDITIONING APPARATUS WHEREIN A PLURALITY OF INDOOR UNITS ARE CONNECTED TO OUTDOOR UNIT

[75] Inventor: Manabu Kitamoto, Shizuoka, Japan

[73] Assignee: Kabushiki Kaisha Toshiba, Kawasaki, Japan

[21] Appl. No.: 903,766

[22] Filed: Jun. 25, 1992

[30] Foreign Application Priority Data

Jun. 28, 1991 [JP] Japan .................................. 3-183767

[51] Int. Cl.⁵ .............................................. F25B 31/00
[52] U.S. Cl. .......................................... 62/175; 62/193
[58] Field of Search .............................. 62/175, 193, 84

[56] References Cited

U.S. PATENT DOCUMENTS 4,870,831 10/1989 Kitamoto ..................... 62/193 X
4,926,652 5/1990 Kitamoto ........................ 62/175

FOREIGN PATENT DOCUMENTS 2166228 4/1986 United Kingdom ............ 62/175
2209851 5/1989 United Kingdom .
2215866 9/1989 United Kingdom .
2215867 9/1989 United Kingdom .

Primary Examiner—William E. Wayner
Attorney, Agent, or Firm—Cushman, Darby & Cushman

[57] ABSTRACT

An air-conditioning apparatus comprises at least one variable-capability compressor which is contained in a casing together with a lubricating oil, and at least one fixed-capability compressor which is also contained in a casing together with a lubricating oil. The capability of the variable-capability compressor and the number of fixed-capability compressors to be driven, are controlled in accordance with the sum of the air-conditioning loads of a plurality of indoor units. The casings are connected together by means of an oil-balancing pipe. The air-conditioning apparatus further comprises a plurality of oil-balancing devices. These oil-balancing devices are driven on the basis of different control patterns and distribute the lubricating oil between the casings by way of the oil-balancing pipe. The oil-balancing devices are selectively driven in accordance with both the control of the capability of the variable-capability compressor and the control of the number of fixed capability compressors to be driven.

8 Claims, 10 Drawing Sheets

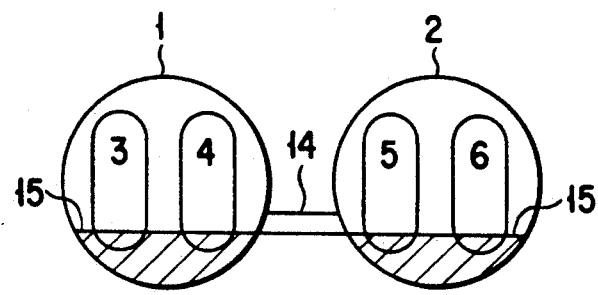
F I G. 2
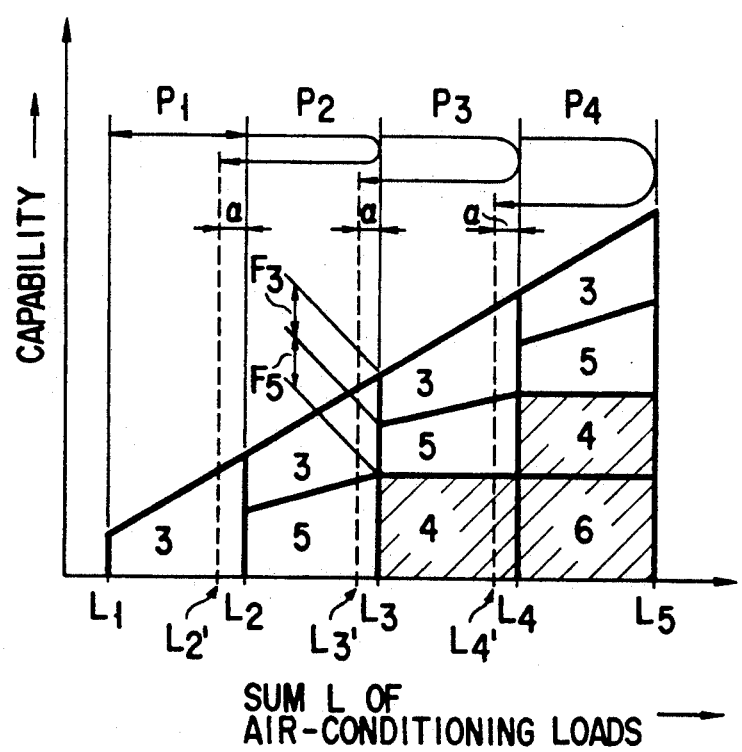
F I G. 4

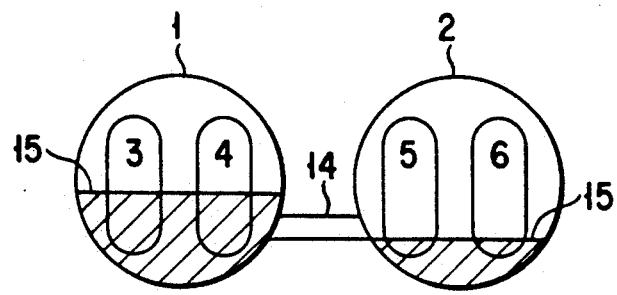
F I G. 9
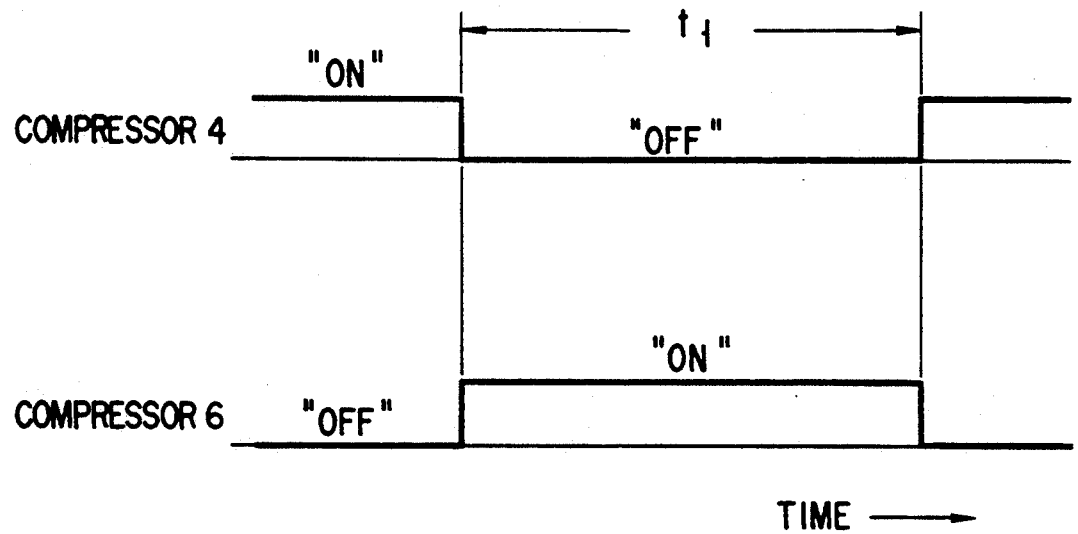
F I G. 10

AIR-CONDITIONING APPARATUS WHEREIN A PLURALITY OF INDOOR UNITS ARE CONNECTED TO OUTDOOR UNIT

BACKGROUND OF THE INVENTION

1. Field of the Invention

The present invention relates to an air-conditioning apparatus which comprises a plurality of compressors, and which controls the number of compressors driven and the capacities of the driven compressors in accordance with the air-conditioning load.

2. Description of the Related Art

In an air-conditioning apparatus comprising a plurality of indoor units, a plurality of compressors are provided for a single outdoor unit, and the number of compressors driven and the capacities of the driven compressors are controlled in accordance with the sum of the air-conditioning loads of the indoor units. An example of such an air-conditioning apparatus is disclosed in U.S. Pat. No. 4,926,652.

In the air-conditioning apparatus disclosed in this U.S. patent, each compressor is contained in a casing filled with a lubricating oil.

In general, the lubricating oil is likely to collect in the casing containing a high-capability compressor, as a result of which a lubricating oil shortage may occur in the casing containing a low-capability compressor.

To solve this problem, in one type of conventional air-conditioning apparatus, the casings of compressors are connected by means of an oil-balancing pipe, and a so-called oil-balancing operation is regularly executed, so as to permit the compressors to have different capabilities. By the oil-balancing operation, different pressures are produced in the casings and the lubricating oil is uniformly distributed between the casings. An example of such a type of air-conditioning apparatus is disclosed in U.S. Pat. No. 4,870,831.

In an air-conditioning apparatus comprising both a variable-capability compressor driven by an inverter and a fixed-capability compressor operating on a commercial power supply, the compressors are driven in combination. Where the compressors are driven in combination, the lubricating oil cannot be uniformly distributed between the compressors by the abovementioned oil-balancing operation wherein the compressors are merely permitted to have different capabilities.

SUMMARY OF THE INVENTION

Accordingly, an object of the present invention is to provide an air-conditioning apparatus which enables the lubricating oil to be uniformly distributed between the compressors, for the efficient driving of each compressor, and which permits each compressor to withstand long use.

To achieve this object, the present invention provides an air-conditioning apparatus in which a plurality of indoor units are connected to a single outdoor unit and which comprises:

at least one variable-capability compressor provided for the outdoor unit and contained in a casing together with a lubricating oil;

at least one fixed-capability compressor provided for the outdoor unit and contained in a casing together with a lubricating oil;

an oil-balancing pipe connecting the casings of the compressors together, an outdoor heat exchanger provided for the outdoor unit;

a plurality of indoor heat exchangers provided for the indoor units, respectively;

a refrigeration cycle for connecting the compressors, the outdoor heat exchanger and the indoor heat exchangers together;

detecting means, provided for the indoor units, respectively, for detecting air-conditioning loads;

first control means for controlling capability of the variable capability compressor and the fixed-capability compressor driven, in accordance with a sum of the air-conditioning loads detected by the detecting means;

a plurality of oil-balancing operation means, operating on the basis of different control patterns, for distributing the lubricating oil between the compressors by way of the oil-balancing pipe; and second control means for selectively driving the oil-balancing operation means in accordance with the control executed by the first control means.

Additional objects and advantages of the invention will be set forth in the description which follows, and in part will be obvious from the description, or may be learned by practice of the invention. The objects and advantages of the invention ma be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows how an oil-balancing pipe is connected to each casing;

FIG. 4 is a graph relating to the first embodiment and showing the capabilities of compressors and the control conditions by which to determine the number of compressors to be driven;

FIGS. 8 and 9 are diagrams illustrating the relationships between the amounts of lubricating oil contained in the casings;

FIG. 10 is a timing chart illustrating how a second oil-balancing operation is performed in the first embodiment;

DETAILED DESCRIPTION OF THE PREFERRED EMBODIMENTS

The first embodiment of the present invention will now be described with reference to the accompanying drawings.

Figure 1:
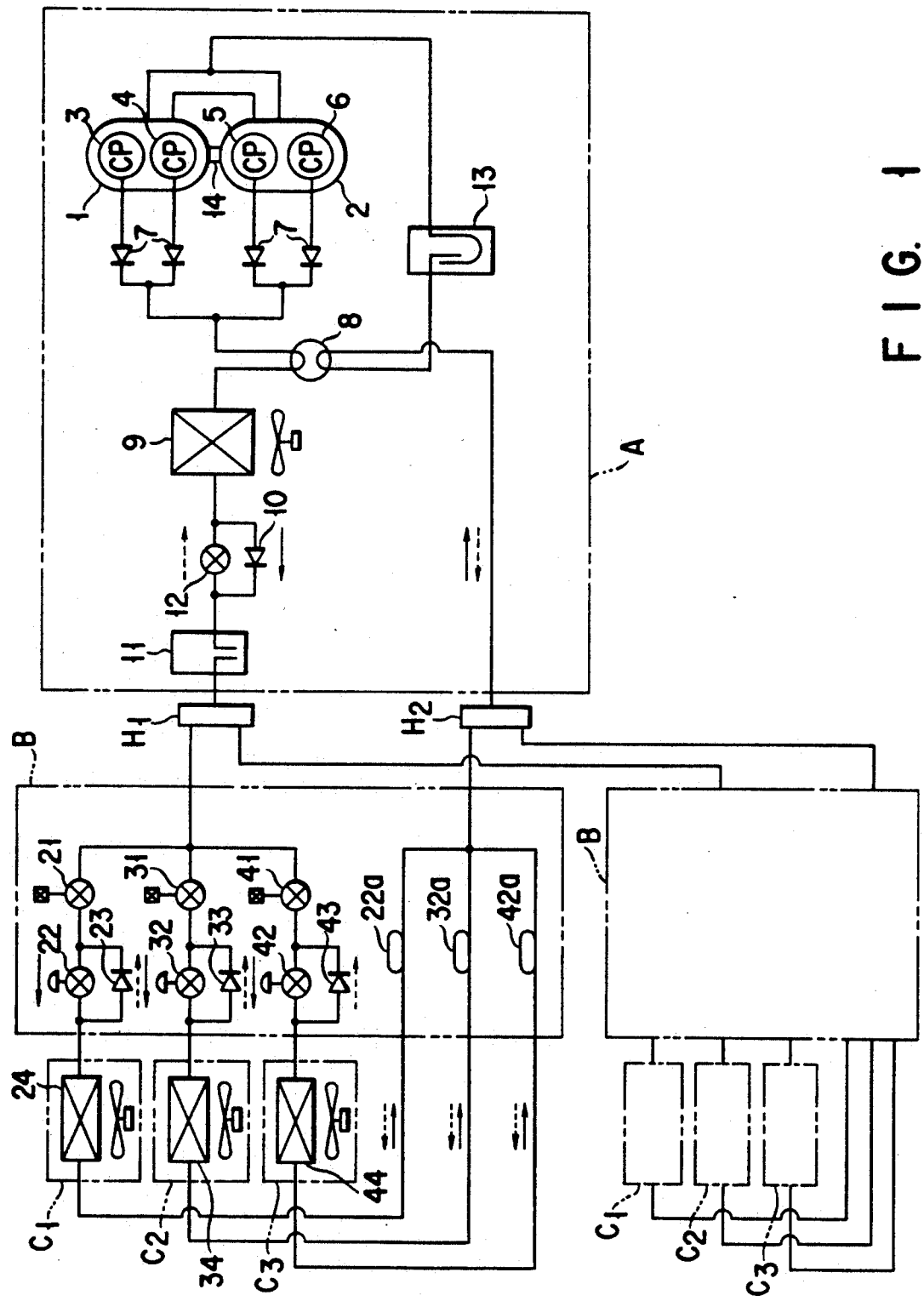
FIG. 1 is a diagram showing the refrigeration cycle employed in the first embodiment of the present invention.

Referring to FIG. 1, reference symbol A denotes an outdoor unit, and a plurality of indoor units $C_1$, $C_2$ and $C_3$ are connected to the outdoor unit A through a distribution unit B.

The outdoor unit A comprises a variable-capability compressor 3 controlled by an inverter, a fixed-capability compressor 4 driven by a commercial power supply, a variable-capability compressor 5 controlled by an inverter, and a fixed-capability compressor 6 driven by the commercial power supply.

Each of the compressors sucks a refrigerant from a suction port thereof, compresses the refrigerant, and discharges the compressed refrigerant from a discharge port.

Variable-capability compressor 3 and fixed-capability compressor 4 are housed in the same casing 1. Likewise, variable-capability compressor 5 and fixed-capability compressor 6 are housed in the same casing 2.

An outdoor heat exchanger 9 is connected to the discharge ports of the compressors 3, 4, 5 and 6 through check valves 7 and a four-way valve 8. The outdoor heat exchanger 9 exchanges heat between the refrigerant supplied thereto and the outdoor air.

A header $H_1$ is connected to the outdoor heat exchanger 9 through a check valve 10 and a liquid receiver 11.

An expansion valve 12 for a heating operation is connected in parallel to the check valve 10.

Indoor units $C_1$, $C_2$ and $C_3$ comprise indoor heat exchangers 24, 34 and 44, respectively, and the distribution unit B comprises electric-type flow control valves 21, 31 and 41, and expansion valves 22, 32 and 42 each for a cooling operation. The indoor heat exchangers 24, 34 and 44 are connected to the header $H_1$ by way of flow control valves 21, 31 and 41 and expansion valves 22, 32 and 42, respectively.

Each of the flow control valves 21, 31 and 41 is a pulse motor valve whose orifice is controlled in accordance with the number of driving pulses supplied thereto. Each flow control valve will be hereinafter referred to as a PMV.

Indoor heat exchangers 24, 34 and 44 exchange heat between the refrigerants supplied thereto and the indoor air.

Check valves 23, 33 and 43, each for a heating operation, are connected in parallel to the expansion valves 22, 32 and 42, respectively.

A header $H_2$ is connected to the indoor heat exchangers 24, 34 and 44. The suction ports of the compressors 3, 4, 5 and 6 are connected to the header $H_2$ through the four-way valve 8 and an accumulator 13.

With the structure mentioned above, the outdoor unit A, the distribution unit B, and the indoor units $C_1$, $C_2$ and $C_3$ jointly provide a heat pump type refrigeration cycle.

The expansions valves 22, 32 and 42 are provided with temperature-sensing elements 22a, 32a and 42a, respectively. The temperature-sensing elements 22a, 32a and 42a are attached to those portions of gas-side pipes which are located between the indoor heat exchangers 24, and 44 and the header $H_2$.

The orifices of the expansion valves 22, 32 and 42 are controlled such that the difference between the temperature of the refrigerant supplied to the expansion valves and the temperature sensed by the temperature-sensing elements 22a, 32a and 42a is maintained at a constant value (the temperature difference: a degree of superheat).

The casings 1 and 2 are connected to each other by means of an oil-balancing pipe 14. As is shown in FIG. 2, the oil-balancing pipe 14 is coupled to predetermined oil level positions of the casings 1 and 2, and permits a lubricating oil 15 to flow between the casings 1 and 2.

Figure 3:
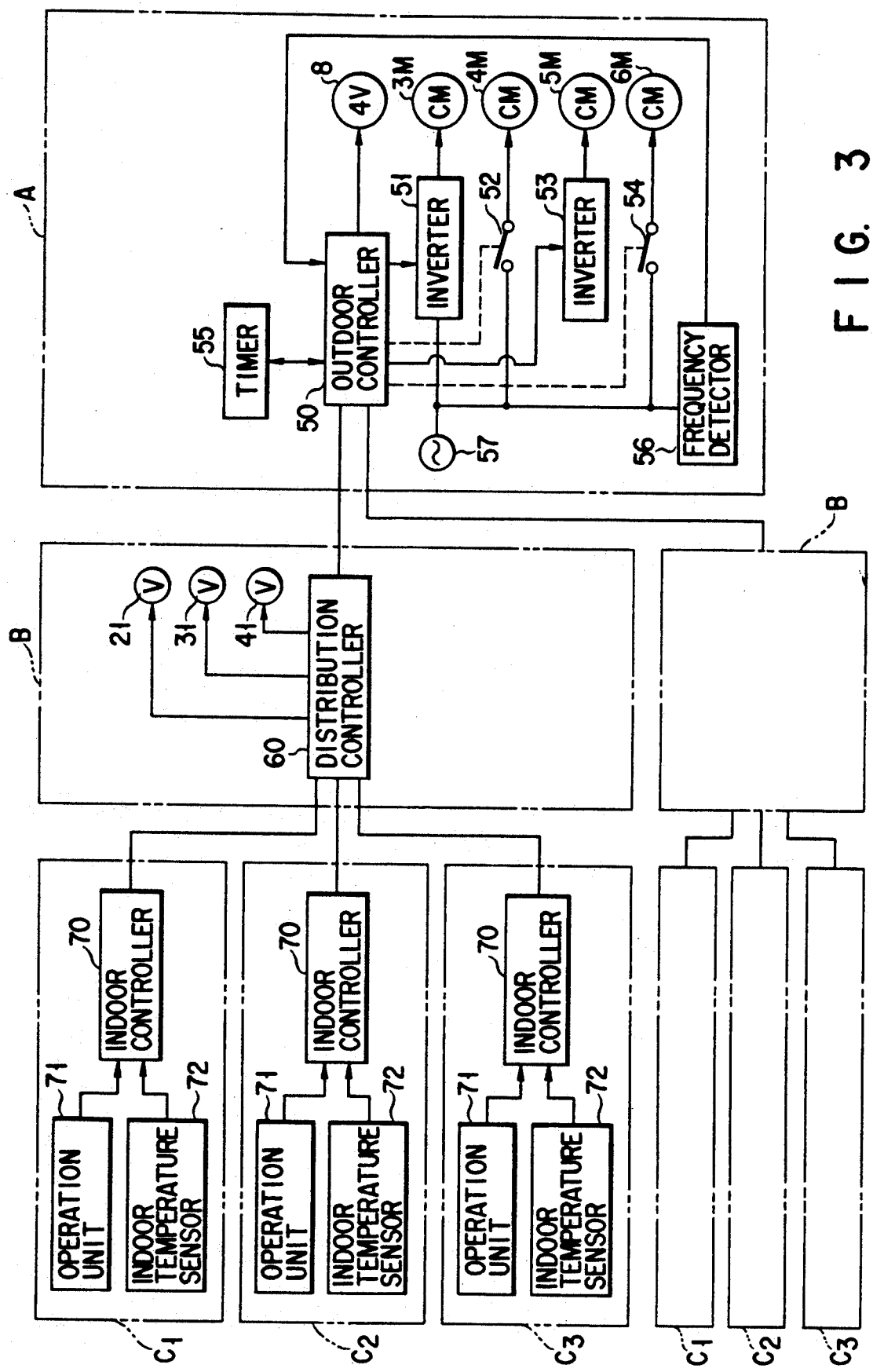
FIG. 3 is a block diagram showing the control circuit employed in the first embodiment.

The control circuit employed in the first embodiment is shown in FIG. 3.

Referring to FIG. 3, the outdoor unit A comprises an outdoor controller 50. The outdoor controller 50 is connected to the distribution controller 60 of the distribution unit B, and the distribution controller 60 is connected to each of the indoor controllers 70 of the indoor units $C_1$, $C_2$ and $C_3$.

The outdoor controller 50 is made by a microcomputer and its peripheral circuits. The four-way valve 8 mentioned above, inverters 51 and 53, switches 52 and 54, a timer 55, and a frequency detector 56 are connected to the outdoor controller 50.

The inverters 51 and 53 rectifies the voltage of a commercial a.c. power supply 57, converts the rectified voltage into a voltage whose frequency is designated by a command issued by the outdoor controller 50, and outputs the converted voltage. The output voltage is supplied to the motors 3M and 5M of compressors 3 and 5. The switches 52 and 54 are made by relay contacts, for example.

The motors 4M and 6M of compressors 4 and 6 are connected to the commercial a.c. power supply 57 through the switches 52 and 54. With this connection, the switches 52 and 54 control the power supply voltage applied to the motors 4M and 6M.

The frequency detector 56 detects the frequency of the commercial a.c. power supply 57.

The distribution controller 60 is made by a microcomputer and its peripheral circuits. The PMVs (pulse motor valves) 21, 31 and 41 are connected to the distribution controller 60.

Each of the indoor controllers 70 is made by a microcomputer and its peripheral circuits. A remote-controlled operation unit 71 and an indoor temperature sensor 72 are connected to the corresponding indoor controller 70.

Each indoor controller 70 comprises the following function means:

(1) means for supplying an operation start command, an operation mode command and an operation stop command to the distribution unit B in response to signals entered from the operation-unit 71; and (2) means for calculating the difference between the temperature sensed by the indoor temperature sensor 72 and the temperature set by means of the operation unit 71, and for providing the distribution unit B with the information on the calculated difference as an air-conditioning load.

The distribution controller 60 comprises the following function means:

(1) means for calculating the sum L of the air-conditioning loads of indoor units $C_1$, $C_2$ and $C_3$, and providing the outdoor unit A with the information on the calculated sum L; and (2) means for controlling the orifices of the PMVs 21, 31 and 41 in accordance with the air-conditioning loads of indoor units $C_1$, $C_2$ and $C_3$, respectively.

The outdoor controller 50 comprises the following function means:

(1) first control means for controlling the capabilities of the variable-capability compressors 3 and 5 (i.e., the output frequencies of the inverters 51 and 53) and the number of fixed-capability compressors 4 and 6 to be driven (i.e., the state of switches 52 and 54), in accordance with the sum L of the air-conditioning loads and on the basis of different control patterns $P_1$, $P_2$, $P_3$ and $P_4$, and for controlling the pattern-switching values to differ by predetermined value c between the time when the sum L of the air-conditioning loads is increasing and the time when the sum L is decreasing;

(2) a plurality of oil-balancing operation means, operating on the basis of different control patterns, for distributing the lubricating oil 15 between the casings 1 and 2 through the oil-balancing pipe 14, the plurality of oil-balancing operation means including first oil-balancing operation mean for varying the capabilities of the variable-capability compressors 3 and 5, and second oil-balancing operation means for turning on or off the fixed-capability compressors 4 and 6;

(3) second control means for selectively actuating the first and second oil-balancing operation means in accordance with the control executed by the first control means; and (4) third control means for varying the control values which the first control means determines with respect to the output frequencies of the inverters 51 and 53, such that the control values correspond to the power source frequency detected by the frequency detector 56.

A description will now be given of the operation performed by the above-mentioned air-conditioning apparatus.

In the cooling operation mode, the four-way valve 8 is neutral, and the refrigerant discharged from the compressors 3, 4, 5 and 6 flows in the direction indicated by the solid arrow in FIG. 1. To be more specific, the refrigerant discharged from the compressors 3, 4, 5 and 6 flows into the outdoor heat exchanger 9, the refrigerant from the outdoor heat exchanger 9 flows into the indoor heat exchangers 24, 34 and 44, and the refrigerant from the indoor heat exchangers 24, 34 and 44 flows back into the compressors 3, 4, 5 and 6. In this case, the outdoor heat exchanger 9 serves as a condenser, while the indoor heat exchangers 24, 34 and 44 each serve as an evaporator. Accordingly, the rooms are cooled.

In the cooling operation mode, the air-conditioning loads are detected in the indoor units $C_1$, $C_2$ and $C_3$, and the orifices of the PMVs 21, 31 and 41 are controlled in accordance with the detected air-conditioning loads. As a result, optimal cooling capabilities, corresponding to the air-conditioning loads of the rooms, are attained.

In the heating operation mode, the four-way valve 8 is changed over, and the refrigerant discharged from the compressors 3, 4, 5 and 6 flows in the direction indicated by the broken arrow in FIG. 1. To be more specific, the refrigerant discharged from the compressors 3, 4, 5 and 6 flows into the indoor heat exchangers 24, 34 and 44, the refrigerant from the indoor heat exchangers 24, 34 and 44 flows into the outdoor heat exchanger 9, and the refrigerant from the outdoor heat exchanger 9 flows back into the compressors 3, 4, 5 and 6. In this case, the indoor heat exchangers 24, 34 and 44 each serve as a condenser, while the outdoor heat exchanger 9 serves as an evaporator. Accordingly, the rooms are warmed.

In the heating operation mode, the air-conditioning loads are detected in the indoor units $C_1$, $C_2$ and $C_3$, and the orifices of the PMVs 21, 31 and 41 are controlled in accordance with the detected air-conditioning loads. As a result, optimal heating capabilities, corresponding to the air-conditioning loads of the rooms, are attained.

During the operation of the air-conditioning apparatus, the capabilities of the compressors 3, 4, 5 and 6 and the number of compressors driven are controlled on the basis of both the sum L of the air-conditioning loads detected by the indoor units $C_1$, $C_2$ and $C_3$ and the operating conditions shown in FIG. 4.

Figure 5:
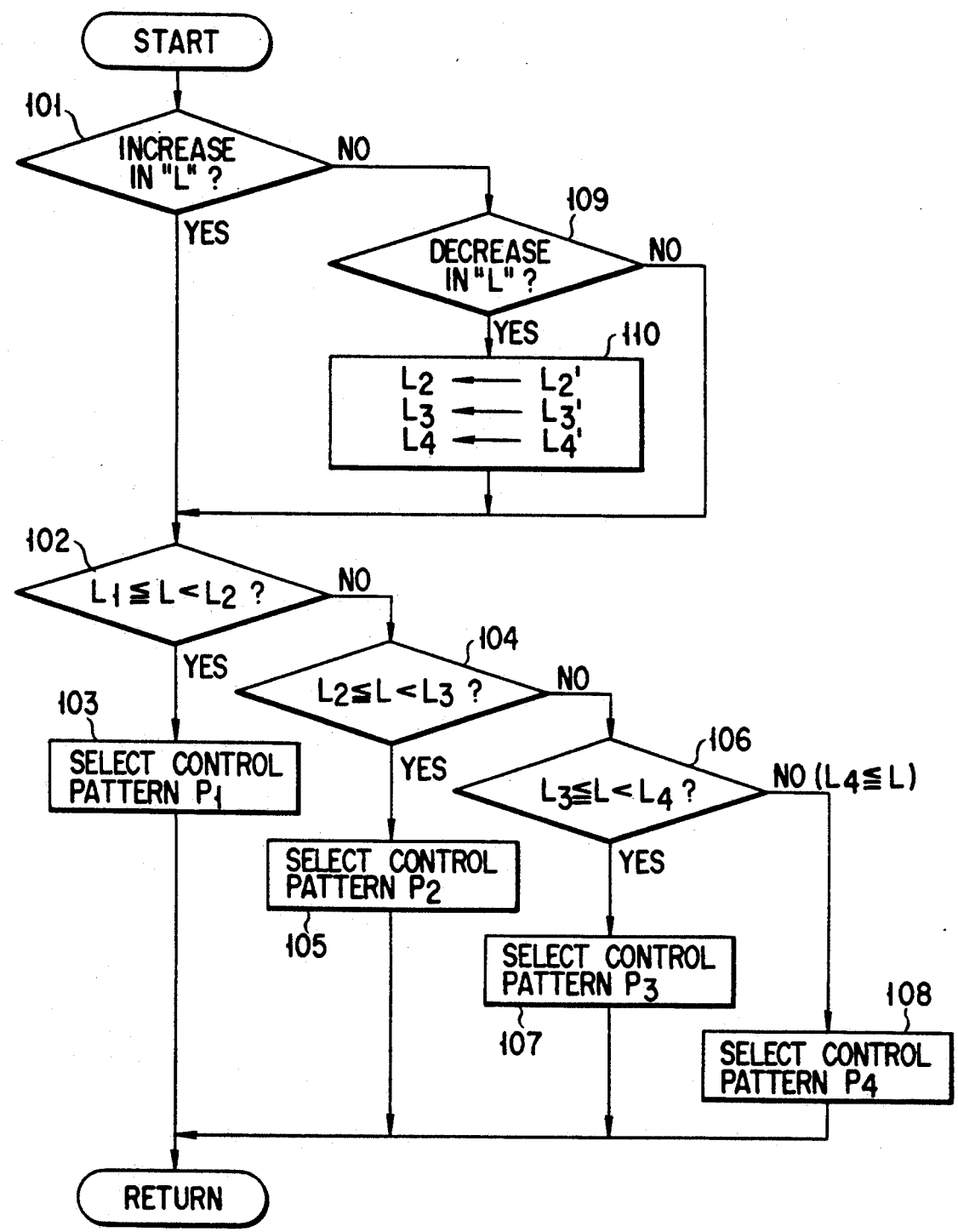
FIG. 5 is a flowchart relating to the first embodiment and illustrating how the capabilities of the compressors and the number of compressors to be driven are controlled.
Figure 6:
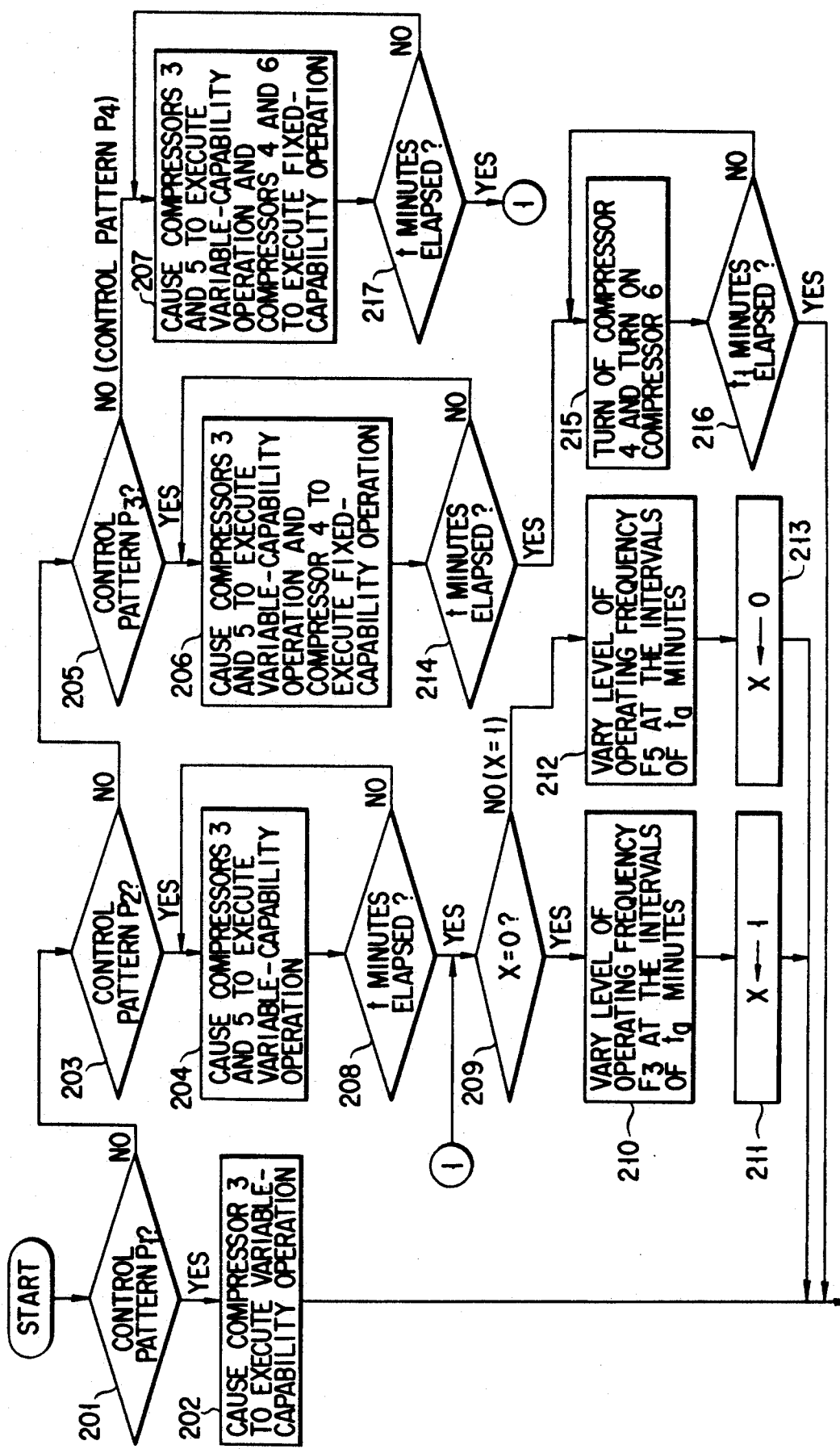
FIG. 6 is a flowchart illustrating how oil-balancing operations are performed in the first embodiment.

How this control is carried out will be described, referring to the flowcharts shown in FIGS. 5 and 6.

First, a description will be given to the case where the air-conditioning loads increase ("YES" in step 101).

When the sum L of the air-conditioning loads is small, for example when it is determined in step 102 that the sum L is between preset values $L_1$ and $L_2$ ($L_1 \leq L < L_2$), control pattern $P_1$ is selected in step 103.

When the selection of control pattern $P_1$ is confirmed in step 201, compressor 3 is caused to execute a variable-capability operation in step 202. To be more specific, the inverter 51 is driven, and the output frequency of this inverter 51 is controlled in proportion to the sum L of the air-conditioning loads. The higher the output frequency of the inverter 51 is, the more the capability of the compressor 3 increases.

When the sum L of the air-conditioning loads increases and is determined to be between preset values $L_2$ and $L_3$ ($L_2 \leq L < L_3$) in step 104, control pattern $P_2$ is selected in step 105.

When the selection of control pattern $P_2$ is confirmed in step 203, compressors 3 and 5 are caused to execute a variable-capability operation in step 204. To be more specific, the inverters 51 and 53 are driven, and the output frequencies of these inverters 51 and 53 are controlled in proportion to the sum L of the air-conditioning loads. The higher the output frequencies of the inverters 51 and 53 are, the more the capabilities of the compressors 3 and 5 increase.

When the sum L of the air-conditioning loads further increases and is determined to be between preset values $L_3$ and $L_4$ ($L_3 \leq L < L_4$) in step 106, control pattern $P_3$ is selected in step 107.

When the selection of control pattern $P_3$ is confirmed in step 205, compressors 3 and 5 are caused to execute a variable-capability operation and compressor 4 is caused to execute a fixed-capability operation in step 206. To be more specific, the inverter 51 and 53 is driven, and the switch 52 is turned on to cause compressor 4 to perform the fixed-capability operation.

When the sum L of the air-conditioning loads is determined as exceeding preset value $L_4$ ($L_4 \leq L$) ("NO" in step 106), control pattern $P_4$ is selected in step 108.

When the selection of control pattern $P_4$ ("NO" in step 205), compressor 3 and 5 are caused to execute a variable-capability operation and compressor 4 and 6 are caused to execute a fixed-capability operation in step 207. To be more specific, the inverters 51 and 53 are driven, and the switches 52 and 54 are turned on to cause compressors 4 and 6 to perform the fixed-capability operation.

Next, a description will be given to the case where the air-conditioning loads decrease ("YES" in step 109). In this case, preset values $L_2'$, $L_3'$ and $L_4'$ are used in place of preset values $L_2$, $L_3$ and $L_4$. Values $L_2'$, $L_3'$ and $L_4'$ are smaller than values $L_2$, $L_3$ and $L_4$, respectively, by predetermined value $\alpha$.

The control pattern is switched from $P_1$ to $P_2$ when the sum L of the air-conditioning loads increases to preset value $L_2$, but is switched from $P_2$ to $P_1$ when the sum L decreases to preset value $L_2'$. The control pattern is switched from $P_2$ to $P_3$ when the sum L increases to preset value $L_3$, but is switched from $P_3$ to $P_2$ when the sum L decreases to preset value $L_3'$. The control pattern is switched from $P_3$ to $P_4$ when the sum L increases to preset value $L_4$, but is switched from $P_4$ to $P_3$ when the sum L decreases to preset value $L_4'$.

As is understood from the above, the values for switching the control pattern from one to another are different between the case where the air-conditioning loads are increasing and the case where they are decreasing. As a result of this, the control pattern need not be frequently switched, and the air-conditioning apparatus is permitted to operate in a stable manner.

In control pattern $P_1$ wherein only compressor 3 is driven, an oil-balancing operation is not executed, since a sufficient amount of lubricating oil 15 is contained in the casing 1 that houses compressor 3.

Figure 7:
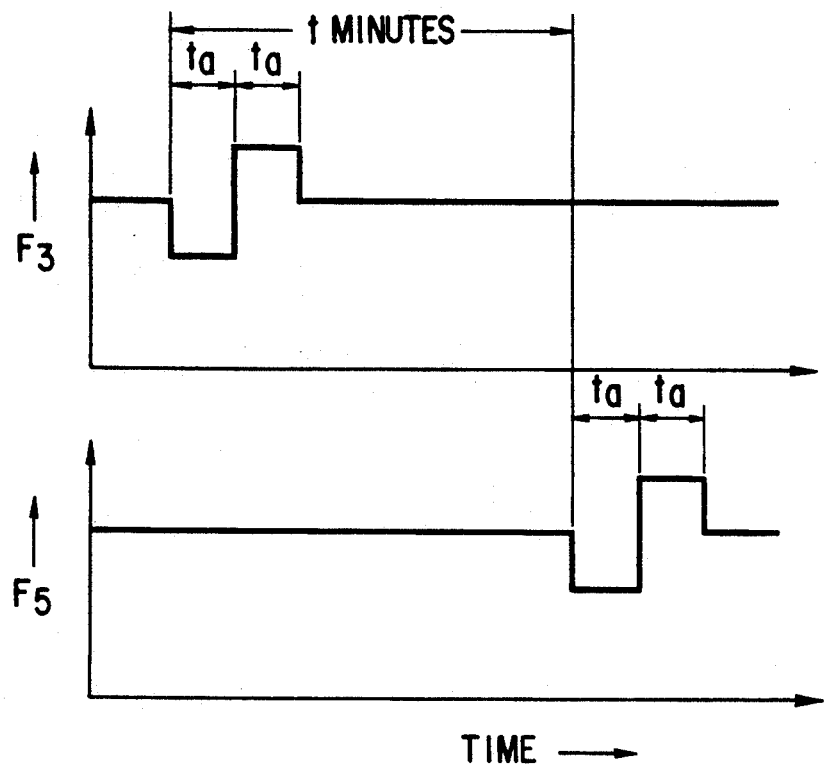
FIG. 7 is a timing chart illustrating how a first oil-balancing operation is performed in the first embodiment.

In control pattern $P_2$, the first oil-balancing operation shown in FIG. 7 is executed.

Specifically, each time t minutes have elapsed, the state of flag X is checked (steps 208 and 209).

If flag X is "0" in step 209, the level of the operating frequency $F_3$ of compressor 3 (i.e., the output frequency of inverter 51) is varied at the interval of ta minutes in step 210. Thereafter, flag X is set to be "1" in step 211.

If flag X is "1" in step 209, the level of the operating frequency $F_5$ of compressor 5 (i.e., the output frequency of inverter 53) is varied at the intervals of ta minutes in step 212. Thereafter, flag X is set to be "0" in step 213.

In this manner, the variation in the level of the operating frequency $F_3$ and the variation in the level of the operating frequency $F_5$ are alternately repeated at the intervals of t minutes.

The elapse of t and ta minutes are measured by means of the timer 55.

Figure 8:
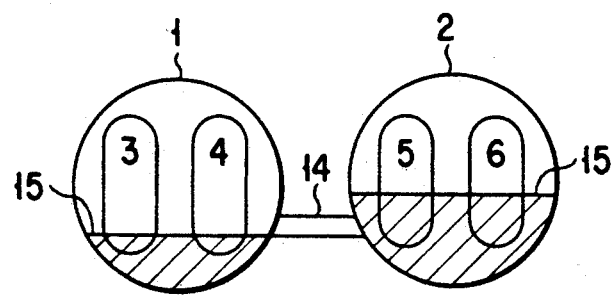

Since the operating frequency $F_3$ is varied in level, the lubricating oil 15 first moves from casing 1 to casing 2 through the oil-balancing pipe 14, as is shown in FIG. 8, and then moves from casing 2 to casing 1 through the same oil-balancing pipe 14, as is shown in FIG. 9.

Since the operating frequency $F_5$ is varied in level, the lubricating oil 15 first moves from casing 2 to casing 1 through the oil-balancing pipe 14, as is shown in FIG. 9, and then moves from casing 1 to casing 2 through the same oil-balancing pipe 14, as is shown in FIG. 8.

Because of this movement of the lubricating oil 15, the lubricating oil 15 is uniformly distributed between the casings 1 and 2.

In control pattern $P_3$, the second oil-balancing operation shown in FIG. 10 is executed.

Specifically, each time t minutes have elapsed, compressor 4 is kept off for t1 minutes, and compressor 6 is kept on for the same t1 minutes (steps 214, 215 and 216).

The elapse of t and t1 minutes are measured by means of the timer 55.

Before the execution of the second oil-balancing operation, a larger amount of lubricating oil 15 exists in casing 1 than in casing 2. In the second oil-balancing operation, however, compressor 4 is turned off and compressor 6 is turned on, so that the lubricating oil 15 moves from casing 1 to casing 2 by way of the oil-balancing pipe 14. Thereafter, compressor 4 is turned on and compressor 6 is turned off, so that the lubricating oil 15 moves from casing 2 to casing 1, as is shown in FIG. 8.

Because of this movement of the lubricating oil 15, the lubricating oil 15 is uniformly distributed between the casings 1 and 2.

In control pattern $P_4$, the first oil-balancing operation is executed, as in control pattern $P_2$. That is, the variation in the level of the operating frequency $F_3$ and the variation in the level of the operating frequency $F_5$ are alternately repeated at the intervals of t minutes (step 217).

With the first and second oil-balancing operations being selectively executed in accordance with the control patterns, the lubricating oil 15 can be uniformly distributed between the casings 1 and 2.

Accordingly, the compressors 3, 4, 5 and 6 can continue to operate with high efficiency, and can withstand long use.

In control patterns $P_3$ and $P_4$ wherein fixed-capability compressors 4 and 6 are driven, a capability difference is brought about between the case where the frequency of the power supply 57 is 50 Hz and the case where it is 60 Hz. In control patterns $P_3$ and $P_4$, therefore, the control values determined with respect to the operating frequencies $F_3$ and $F_5$ of the compressors 3 and 5 are varied in accordance with the power supply frequency detected by the frequency detector 56. Where the power supply frequency is 50 Hz, the operating frequency is set to be higher than that of the case where the power supply frequency is 60 Hz.

For example, in the case of preset value $L_3$, the operating frequencies $F_3$ and $F_5$ are set to be 70 Hz where the power supply frequency is 50 Hz, and are set to be 50 Hz where the power supply frequency is 60 Hz.

With the operating frequencies $F_3$ and $F_5$ of the variable-capability compressors 3 and 5 being adjusted in this manner, the capability difference which the fixed-capability compressors 4 and 6 produce in response to different power supply frequencies can be canceled. Consequently, optimal capabilities are constantly ensured in accordance with the air-conditioning loads, and a comfortable environment can be provided.

A description will now be given of the second embodiment of the present invention.

In the second embodiment, only compressor 3 is a variable-capability type, and compressors 4, 5 and 6 are a fixed-capability type.

Figure 11:
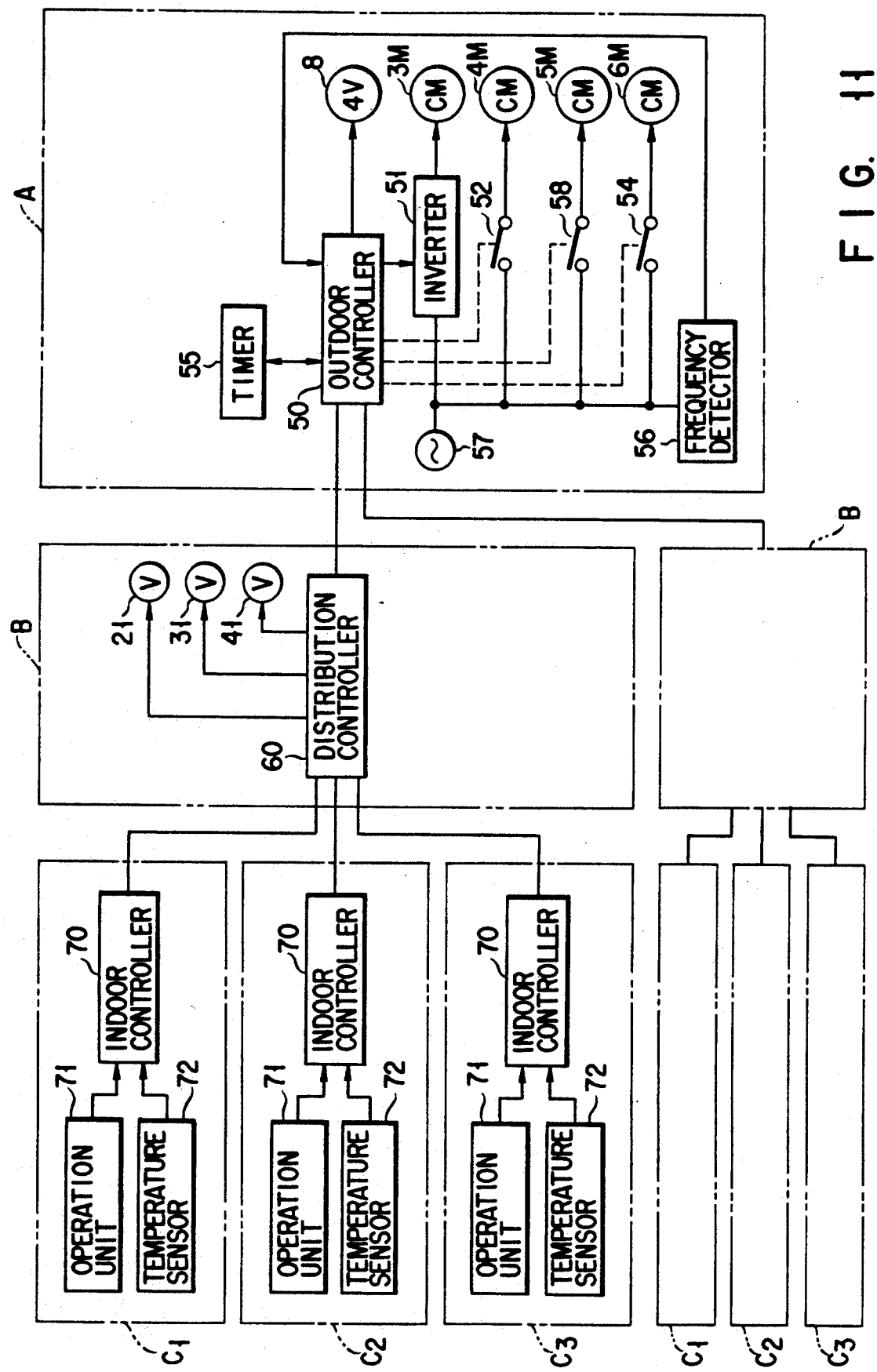
FIG. 11 is a block circuit diagram showing the control circuit employed in the second embodiment of the present invention.

In the control circuit employed in the second embodiment, the motor 4M of compressor 4 is connected to the commercial power supply 57 through a switch 58, as is shown in FIG. 11. The switch 58 is a relay contact, for example, and is controlled by the outdoor controller 50.

In the other structure, the second embodiment is similar to the first embodiment.

The operation of the second embodiment will be described.

Figure 12:
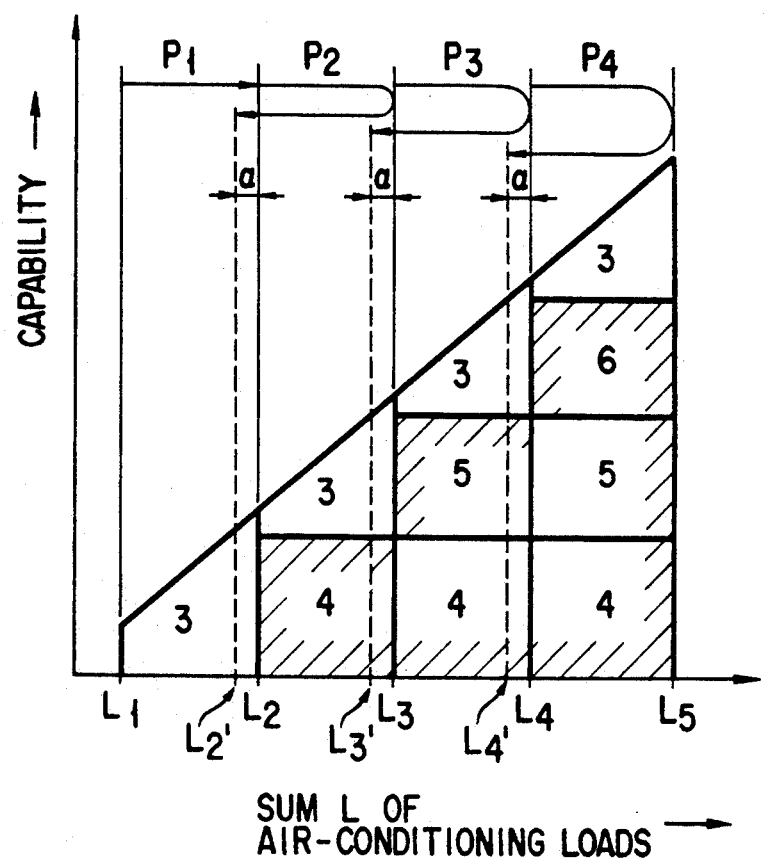
FIG. 12 is a graph showing the capability of each compressor and the control conditions by which to determine the number of compressors to be driven.

During the operation of the air-conditioning apparatus of the second embodiment, the capabilities of the compressor 3 and the number of compressors 4, 5 and 6 to be driven are controlled on the basis of both the sum L of the air-conditioning loads detected by the indoor units $C_1$, $C_2$ and $C_3$ and the operating conditions shown in FIG. 12. This control is carried out in a similar manner to that of the first embodiment, the control manner of which is illustrated in FIG. 5.

Figure 13:
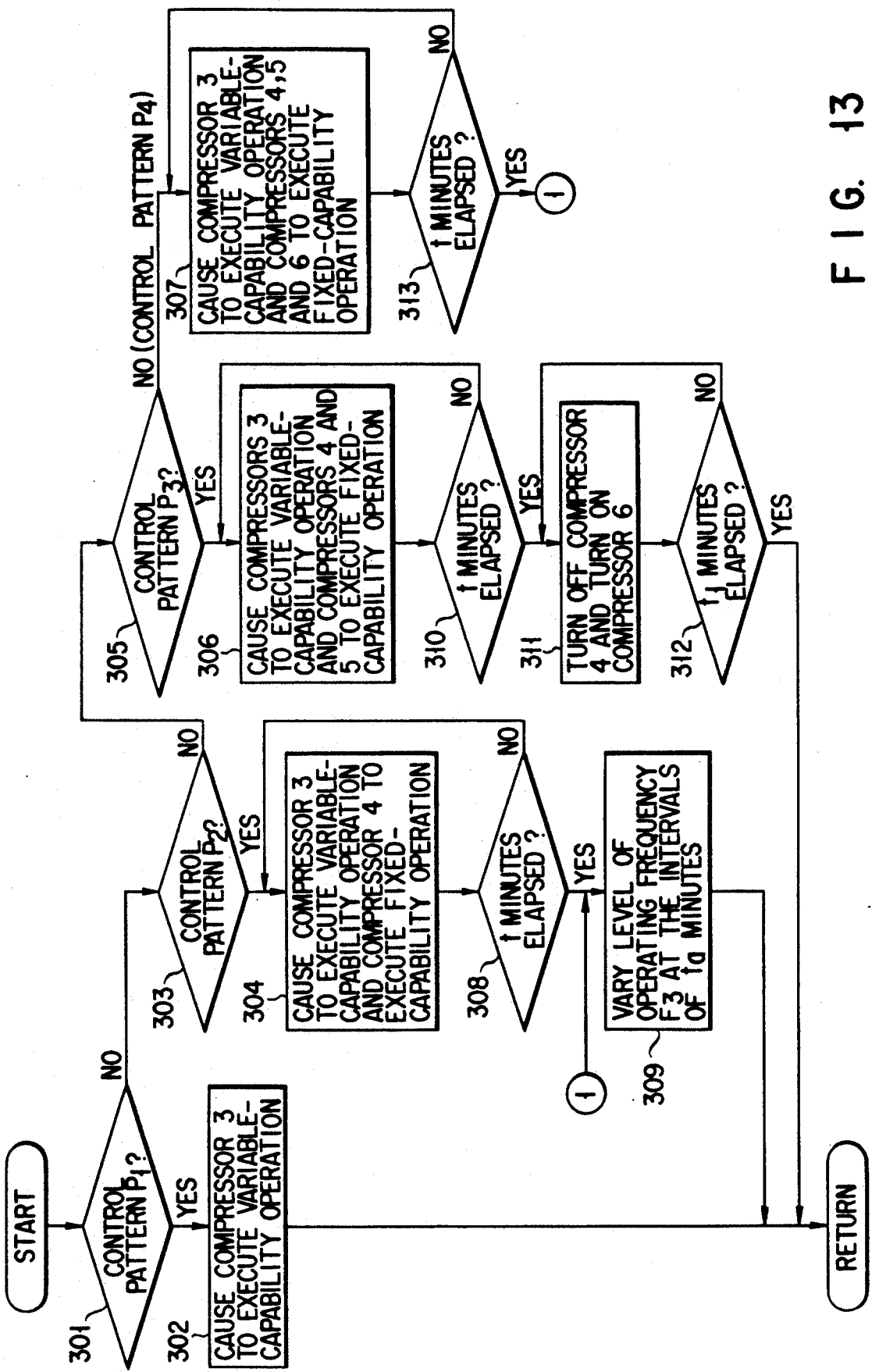
FIG. 13 is a flow chart illustrating how oil-balancing operations are performed in the second embodiment.

As is shown in the flowchart in FIG. 13, when the selection of control pattern $P_1$ is confirmed in step 301, compressor 3 is caused to execute a variable-capability operation in step 302.

When the selection of control pattern $P_2$ is confirmed in step 303, compressor 3 is caused to execute a variable-capability operation and compressor 4 is caused to execute a fixed-capability operation in step 304.

When the selection of control pattern $P_3$ is confirmed in step 305, compressor 3 is caused to execute a variable-capability operation and compressors 4 and 5 are caused to execute a fixed-capability operation in step 306.

When the selection of control pattern $P_4$ is confirmed ("NO" in step 305), compressor 3 is caused to execute a variable-capability operation and compressors 4, 5 and 6 are caused to execute a fixed-capability operation in step 307.

As in the first embodiment, the pattern-switching values differ by predetermined value c between the time when the air-conditioning loads are increasing and the time when they are decreasing. Due to the use of such pattern-switching values, the control pattern need not be frequently switched from one to another, and the air-conditioning apparatus is permitted to operate in a stable manner.

In control pattern $P_1$ wherein only compressor 3 is driven, an oil-balancing operation is not executed.

In control pattern $P_2$, the first oil-balancing operation is executed by using compressor 3 alone.

Specifically, the operating frequency $F_3$ of compressor 3 (i.e., the output frequency of inverter 51) is varied in level at the intervals of t minutes, and the varied level of the operating frequency $F_3$ is maintained for ta minutes (step 309).

The elapse of t and ta minutes are measured by means of the timer 55.

Since the operating frequency $F_3$ is varied in level, the lubricating oil 15 first moves from casing 1 to casing 2 through the oil-balancing pipe 14, as is shown in FIG. 8, and then moves from casing 2 to casing 1 through the same oil-balancing pipe 14, as is shown in FIG. 9.

Because of this movement of the lubricating oil 15, the lubricating oil 15 is uniformly distributed between the casings 1 and 2.

In control pattern $P_3$, the second oil-balancing operation similar to that of the first embodiment is executed.

Specifically, each time t minutes have elapsed, compressor 4 is kept off for t1 minutes, and compressor 6 is kept on for the same t1 minutes (steps 310, 311 and 312).

The elapse of t and t1 minutes are measured by means of the timer 55.

Before the execution of the second oil-balancing operation, a larger amount of lubricating oil 15 exists in casing 1 than in casing 2. However, since compressor 4 is turned off and compressor 6 is turned on in the second oil-balancing operation, the lubricating oil 15 moves from casing 1 to casing 2 by way of the oil-balancing pipe 14. Since, thereafter, compressor 4 is turned on and compressor 6 is turned off, the lubricating oil 15 moves from casing 2 to casing 1, as is shown in FIG. 8.

Because of this movement of the lubricating oil 15, the lubricating oil 15 is uniformly distributed between the casings 1 and 2.

In control pattern $P_4$, the first oil-balancing operation is executed, as in control pattern $P_2$. That is, the operating frequency $F_3$ is varied in level at the intervals of t minutes.

With the first and second oil-balancing operations being selectively executed in accordance with the control patterns, the lubricating oil 15 can be uniformly distributed between the casings 1 and 2.

Accordingly, the compressors 3, 4, 5 and 6 can continue to operate with high efficiency, and can withstand long use.

In control patterns $P_2$, $P_3$ and $P_4$ wherein compressors 4, 5 and 6 are caused to execute a fixed-capability operation, a capability difference is brought about between the case where the frequency of the power supply 57 is 50 Hz and the case where it is 60 Hz. In control patterns $P_2$, $P_3$ and $P_4$, therefore, the control value determined with respect to the operating frequency $F_3$ of compressor 3 is varied in accordance with the power supply frequency detected by the frequency detector 56. Where the power supply frequency is 50 Hz, the operating frequency $F_3$ is set to be higher than that of the case where the power supply frequency is 60 Hz.

With the operating frequency $F_3$ of the variable-capability compressor 3 being adjusted in this manner, the capability difference which the fixed-capability compressors 4, 5 and 6 produce in response to different power supply frequencies can be canceled. Consequently, optimal capabilities are constantly ensured in accordance with the air-conditioning loads, and a comfortable environment can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An air-conditioning apparatus in which a plurality of indoor units are connected to a single outdoor unit, comprising:

at least one variable-capability compressor provided for the outdoor unit and contained in a casing together with a lubricating oil;

at least one fixed-capability compressor provided for the outdoor unit and contained in a casing together with a lubricating oil;

an oil-balancing pipe connecting the casings of the compressors together;

an outdoor heat exchanger provided for the outdoor unit;

a plurality of indoor heat exchangers provided for the indoor units, respectively;

a refrigeration cycle for connecting the compressors, the outdoor heat exchanger and the indoor heat exchangers together;

first detecting means, provided for the indoor units, respectively, for detecting air-conditioning loads;

an inverter for converting a power supply voltage into a predetermined-frequency voltage and outputting the predetermined-frequency voltage as driving power of the variable-capability compressor; power supply voltage to the fixed-capability compressor;

first control means for controlling the output frequency of the inverter and the state of the switch means in accordance with a sum of the air-conditioning loads detected by the first detecting means;

a plurality of oil-balancing operation means, operating on the basis of different control patterns, for distributing the lubricating oil between the compressors by way of the oil-balancing pipe;

second control means for selectively driving the oil-balancing operation means in accordance with control executed by the first control means;

second detecting means for detecting the frequency of the power supply voltage; and third control means for varying control values which the first control means determines with respect to the output frequency of the inverter, in accordance with the frequency detected by the second detecting means.

2. An apparatus according to claim 1, wherein said compressors are housed in casings such that one variable-capability type and one fixed-capability type are contained in a single casing.

3. An apparatus according to claim 1, wherein said first control means uses different control pattern-switching values between a case where the air-conditioning loads are increasing and a case where the air-conditioning loads are decreasing.

4. An apparatus according to claim 1, wherein said plurality of oil balancing means include:

first oil-balancing operation means for varying the capability of the variable-capability compressor; and second oil-balancing operation means for turning on or off the fixed-capability compressor.

5. An air-conditioning apparatus in which a plurality of indoor units are connected to a single outdoor unit, comprising:

at lesat one variable-capability compressor provided for the outdoor unit;

at least one fixed-capability compressor provided for the outdoor unit;

casings for containing said compressors together with a lubricating oil, such that one variable-capability compressor and one fixed-capability compressor is contained in a single casing;

an oil-balancing pipe connecting the casings of the compressors together;

an outdoor heat exchanger provided for the outdoor unit;

a plurality of indoor heat exchangers provided for the indoor units, respectively;

a refrigeration cycle for connecting the compressors, the outdoor heat exchanger and the indoor heat exchangers together;

detecting means, provided for the indoor units, respectively, for detecting air-conditioning loads;

first control means for controlling capability of the variable-capability compressor and the fixed-capability compressor driven, in accordance with a sum of the air-conditioning loads detected by the detecting means;

a plurality of oil-balancing operation means, operating on the basis of different control patterns, for distributing the lubricating oil between the compressors by way of the oil-balancing pipe; and second control means for selectively driving the oil-balancing operation means in accordance with control executed by the first control means.

6. An air-conditioning apparatus in which a plurality of indoor units are connected to a single outdoor unit, comprising:

at least one variable-capability compressor provided for the outdoor unit and contained in a casing together with a lubricating oil;

at least one fixed-capability compressor provided for the outdoor unit and contained in a casing together with a lubricating oil;

an oil-balancing pipe connecting the casings of the compressors together;

an outdoor heat exchanger provided for the outdoor unit;

a plurality of indoor heat exchangers provided for the indoor units, respectively;

a refrigeration cycle for connecting the compressors, the outdoor heat exchanger and the indoor heat exchanger together;

detecting means, provided for the indoor units, respectively, for detecting air-conditioning loads;

first control means for controlling capability of the variable-capability compressor and the fixed-capability compressor driven, in accordance with a sum of the air-conditioning loads detected by the detecting means;

control pattern switching values used by said first control means, wherein a first set of control pattern switching values is used for increasing air-conditioning loads and a second set of control pattern switching values is used for decreasing air-conditioning loads;

a plurality of oil-balancing operation means, operating on the basis of different control patterns, for distributing the lubricating oil between the compressors by way of the oil-balancing pipe; and second control means for selectively driving the oil-balancing operation means in accordance with control executed by the first control means.

7. An air-conditioning apparatus in which a plurality of indoor units are connected to a single outdoor unit, comprising:

at least one variable-capability compressor provided for the outdoor unit;

at least one fixed-capability compressor provided for the outdoor unit;

casings for containing said compressors together with a lubricating oil, such that one variable-capability compressor and one fixed-capability compressor is contained in a single casing;

an oil-balancing pipe connecting the casings of the compressors together;

an outdoor heat exchanger provided for the outdoor unit;

a plurality of indoor heat exchangers provided for the indoor units, respectively;

a refrigeration cycle for connecting the compressors, the outdoor heat exchanger and the indoor heat exchangers together;

detecting means, provided for the indoor units, respectively, for detecting air-conditioning loads;

an inverter for converting a power supply voltage into a predetermined-frequency voltage and outputting the predetermined-frequency voltage as driving power of the variable-capability compressor;

switch means for controlling application of the power supply voltage to the fixed-capability compressor;

first control means for controlling the output frequency of the inverter and the state of the switch means in accordance with a sum of the air-conditioning loads detected by the detecting means;

a plurality of oil-balancing operation means, operating on the basis of different control patterns, for distributing the lubricating oil between the compressors by way of the oil-balancing pipe; and second control means for selectively driving the oil-balancing operation means in accordance with control executed by the first control means;

8. An air-conditioning apparatus in which a plurality of indoor units are connected to a single outdoor unit, comprising:

at least one variable-capability compressor provided for the outdoor unit and contained in a casing together with a lubricating oil;

at least one fixed-capability compressor provided for the outdoor unit and contained in a casing together with a lubricating oil;

an oil-balancing pipe connecting the casings of the compressors together;

an outdoor heat exchanger provided for the outdoor unit;

a plurality of indoor heat exchangers provided for the indoor units, respectively;

a refrigeration cycle for connecting the compressors, the outdoor heat exchanger and the indoor heat exchangers together;

detecting means, provided for the indoor units, respectively, for detecting air-conditioning loads;

an inverter for converting a power supply voltage into a predetermined-frequency voltage and outputting the predetermined-frequency voltage as driving power of the variable-capability compressor;

switch means for controlling application of the power supply voltage to the fixed-capability compressor;

first control means for controlling the output frequency of the inverter and the state of the switch means in accordance with a sum of the air-conditioning loads detected by the detecting means;

control pattern switching values used by said first control means, wherein a first set of control pattern switching values is used for increasing air-conditioning loads and a second set of control pattern switching values is used for decreasing air-conditioning loads.

a plurality of oil-balancing operation means, operating on the basis of different control patterns, for distributing the lubricating oil between the compressors by way of the oil-balancing pipe; and second control means for selectively driving the oil-balancing operation means in accordance with control executed by the first control means.

* * * * *